United States Patent [19]

Kanamori

[11] Patent Number: 5,726,681

[45] Date of Patent: Mar. 10, 1998

[54] CURSOR WITH DISPLAYED SELECTION RETRIEVAL AREA

[75] Inventor: Hirokazu Kanamori, Kitakatsuragi-gun, Japan

[73] Assignee: Sharp Kabushiki Kaisha, Osaka, Japan

[21] Appl. No.: 514,220

[22] Filed: Aug. 11, 1995

[30] Foreign Application Priority Data

Sep. 7, 1994 [JP] Japan ............... 6-214049

[51] Int. Cl.$^6$ ............... G06F 3/00
[52] U.S. Cl. ............... 345/145; 395/339
[58] Field of Search ............... 345/145, 146; 395/326–358

[56] References Cited

U.S. PATENT DOCUMENTS

| | | | |
|---|---|---|---|
| 4,228,430 | 10/1980 | Iwamura et al. | 345/162 |
| 4,847,605 | 7/1989 | Callahan et al. | 345/145 |
| 4,984,152 | 1/1991 | Muller | 395/349 X |
| 5,068,802 | 11/1991 | Miyashita et al. | 395/133 |
| 5,146,211 | 9/1992 | Adams et al. | 345/145 |
| 5,315,313 | 5/1994 | Shinagawa | 345/145 |
| 5,367,625 | 11/1994 | Ishitani | 395/133 |
| 5,371,514 | 12/1994 | Lawless et al. | 345/145 |
| 5,471,571 | 11/1995 | Smith et al. | 395/137 |
| 5,477,236 | 12/1995 | Nanbu | 345/145 |
| 5,491,494 | 2/1996 | Cornett et al. | 345/118 |
| 5,508,717 | 4/1996 | Miller | 345/145 |
| 5,510,811 | 4/1996 | Tobey et al. | 345/157 |
| 5,559,943 | 9/1996 | Cyr et al. | 395/326 |
| 5,596,699 | 1/1997 | Driskell | 395/352 |

FOREIGN PATENT DOCUMENTS 64216  1/1994  Japan ............... G06F 3/033

OTHER PUBLICATIONS

Seidman, "Change Cursor v2.21 Utility", pp. 1–24, 1991.
"Free Online Dictionary of Computing" Internet Site, http://wombat.coc.ic.ac.uk/, Jan. 1997.
Cowart, "Mastering Windows 3.1" Sybex pp. 688–689, Dec. 1992.
Judd et al. "Microprocessor–Controlled Cursors" IBM TDB, vol. 22 No. 5 p. 2103, Dec. 1979.

Primary Examiner—John E. Breene

[57] ABSTRACT

A graphical user interface system and method for user activated selection of a displayed object. On a display screen of an information processor, a cursor shape and an external shape of a retrieval area surrounding the retrieval area shape are displayed. At the tip of an arrow-like cursor shape, a cursor reference position is blinked and displayed in accordance with the arrow-like cursor shape. An object is selected by operating a pointing device such as a mouse to move the cursor so that at least part of the object enters into the retrieval area shape.

29 Claims, 10 Drawing Sheets

CURSOR WITH DISPLAYED SELECTION RETRIEVAL AREA

BACKGROUND OF THE INVENTION

1. Field of the Invention

The present invention relates to a graphical information processor which provides a point input device for a graphical user interface.

2. Description of the Related Art

Recently, in information processors which incorporate a computer such as a personal computer, a word processor, an electronic notebook or the like, a point input device is widely used which allows users to provide the information processor with necessary instructions by using a pointing device on a graphic display screen. On the graphic display screen, various objects such as various kinds of windows, a menu, a bar, an icon and a letter string are displayed. When users operate the pointing device to select an object on the screen, they can provide the information processor with a necessary instruction. The object is devised so that the function thereof can be easily understood and is displayed at an appropriate timing when needed so that users can provide the information processor with a necessary instruction by a simple operation which is easy for users to understand.

FIG. 10 shows a structure of an information processor providing a pointing device according to a typical prior art system. A central processing unit 30 is connected via a bus to a point input device 31, a point input controller 32, a key input device 33 and a display device 34. As the point input device 31, various kinds of pointing devices such as a mouse, a track ball, or a combination of a pen and a tablet can be used. The point input controller 32 controls the point input device 31. The input from the user is carried out with the key input device 33. Some kind of input information can be inputted with the point input device 31 or by the key input device 33. The display device 34 can be realized by a liquid crystal display (LCD) or by a cathode ray tube (CRT) to display information so that users can operate the information processor and know the operation thereof. The point input device 31 moves a cursor on a display screen of the display apparatus 34 in accordance with the operation of users to provide the information processor with information for selecting an object designated by the cursor.

The display screen of the display device 34 is constituted as one of a dot matrix type in which a plurality of pixels are arranged. The point input controller 32 refers to a search scope storage part 321 which stores a scope of search for retrieving an object with a maximum dot number on the basis of the coordinates of the cursor designated by the point input device 31, a search position storage part 322 for storing the coordinate position of dots to be successively searched within the scope of search, a movement frequency storage part 323 indicating how many movements are necessary to reach the dot of the serach position on the basis of the cursor position. These storage parts 321, 322 and 323 are constituted, for example, as memory areas within one RAM.

FIG. 11 shows an operation of a point input controller 32 shown in FIG. 10. After the start of the operation, at step a1, whether an object is present at a cursor position indicated by the point input device 31 is judged. In the absence of the object, the movement frequency is set at 0 at step a2 to be stored in the movement frequency storage part 323. Next, the process proceeds to step a3 to judge whether the movement frequency is within the search scope or not. When the movement frequency is within the search scope, the search position is moved at step a4. Next, at step a5, it is judged whether the object is present at the moved search position. In the absence of the object, 1 is added to the movement frequency at step a6 to return to step a3. When it is judged at step a5 that the object is present, the process proceeds to step a7, and the cursor is moved to a position where the object judged to be is present is found. When the cursor movement at step a7 is completed, or when it is judged that the object is already present at the cursor position, an instruction is given to the central processing unit 30 to execute an operation in accordance with the object thereby completing the processing. When the movement frequency exceeds the search scope at step a3, it is judged that the object does not exist in the search scope, thereby completing the processing.

Generally the shape of the search scope is equidirectional centering on the cursor position and the search position is spirally moved going away from the cursor position. The applicant of the present invention discloses such a concept of search in Japanese to such a concept, when, for example, a small object is selected, on a display screen, no fine movement is required to set the cursor at a small object. Since the cursor may only be moved into the vicinity of the object, the object can be designated and inputted in a simple and assured manner.

In the point input according to the prior art, the object is searched in an equidirectional scope centering on the cursor position to select an object located at the position nearest to the cursor position. When utilizing a pen and display tablet as the input device, it can happen that the screen and a hand of an operator of the pen overlap and object which is not recognized by users may be selected. When an object is selected which is not intended by users, it is necessary to cancel the selection or to perform an operation for newly selecting a desired object so that operability is deteriorated. Further, even in the case where a pointing device such as a mouse or a track ball is used, when the cursor display has a directional shape such as an arrow, there arises a case in which an equidirectional search is performed to select an object on the opposite side of the arrow direction.

SUMMARY OF THE INVENTION

An object of the invention is to provide an information processor provided with a point input device capable of retrieving an object instruction with favorable operability by referencing a cursor position.

The invention provides an information processor in which a cursor is moved on an information display screen to input and process an object designated by a cursor, the processor comprising:

area setting means for setting a retrieval area on the information display screen in a predetermined direction by referencing a cursor position; and selection means for retrieving an object present within a set retrieval area by referencing the cursor position to input a detected object.

Further, the invention provides an information processor in which a cursor is moved on an information display screen to input and process an object designated by a cursor, the processor comprising:

display control means for displaying a retrieval area predetermined with the cursor on the information display screen; and selection means for retrieving an object present within the displayed retrieval area by referencing to a cursor position to input a detected object.

Further, the invention is characterized in that within the retrieval area a cursor position as a reference for object retrieval is displayed on the information display screen in a mode different from the display mode of the cursor itself.

Further, the invention is characterized by including a plurality of shapes as the retrieval area, any of which is able to be selected.

According to the invention, an object present within the retrieval area set in a predetermined direction by referencing to the cursor position by the area setting means is retrieved and inputted by the selection means and processed by the information processor. Since the cursor position does not constitute the center of retrieval area and has a directive, it is possible, for example, in the case of a right-handed user, to prevent the selection of an object which is not recognized by the user under the shadow of a hand by using an area diagonally to the left above the position designated by the cursor.

Further, according to the invention, the retrieval area can be displayed on the information display screen along with the cursor. Users may only have to operate and move the cursor so that the object is positioned within the retrieval area, resulting in easy and sure selection of the object.

Further, according to the invention, the cursor position which constitutes the reference for the object retrieval can be displayed in a mode different from the display mode of the cursor itself. This enables easy recognition of a position directly designated by the cursor. When a plurality of objects are present in the retrieval area, a desired object can be easily selected by, for example, allowing the cursor position to approach the desired object.

Further, according to the invention, since the shape of retrieval area can be selected, an appropriate shape of display area can be selected depending on the mode of usage such as a left-handed user, a right-handed user, a direct pointing device with a pen or the like, and a pointing device operated at a position separate from the display screen such as a mouse or a track ball.

As described above, according to the invention, an object is not retrieved equidirectionally by centering on a position designated by the cursor. Then, an object is selected which is present within the retrieval area set by setting the retrieval area having a directivity, so that object selection which satisfies a user's intention can be easily and surely realized.

Further, according to the present invention, since the retrieval area is specified along with the cursor, an object can be easily and surely selected by operating the cursor so that the object enters into the retrieval area. Consequently, since undesired object selection can be reduced and fine positioning is not required, the operation efficiency of the point input device can be improved.

Further, according to the present invention, since the cursor position is displayed in a mode different from the display mode of the cursor itself, even in the case where a plurality of objects are present within the retrieval area a desired object can be surely selected by setting the reference position for retrieval to an object to be selected.

Further, according to the present invention, since the shape of the retrieval area can be selected, the shape selection of the retrieval area can be performed so that the work efficiency can be improved depending on whether the user is right-handed or left-handed, or depending on the usage situation and usage purpose of whether a pointing device such as a pen or the like which directly works on a display screen.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings which are given by way of illustration only, and thus are not limitative of the present invention and wherein.

DETAILED DESCRIPTION OF THE PREFERRED EMBODIMENTS

Figure 1:
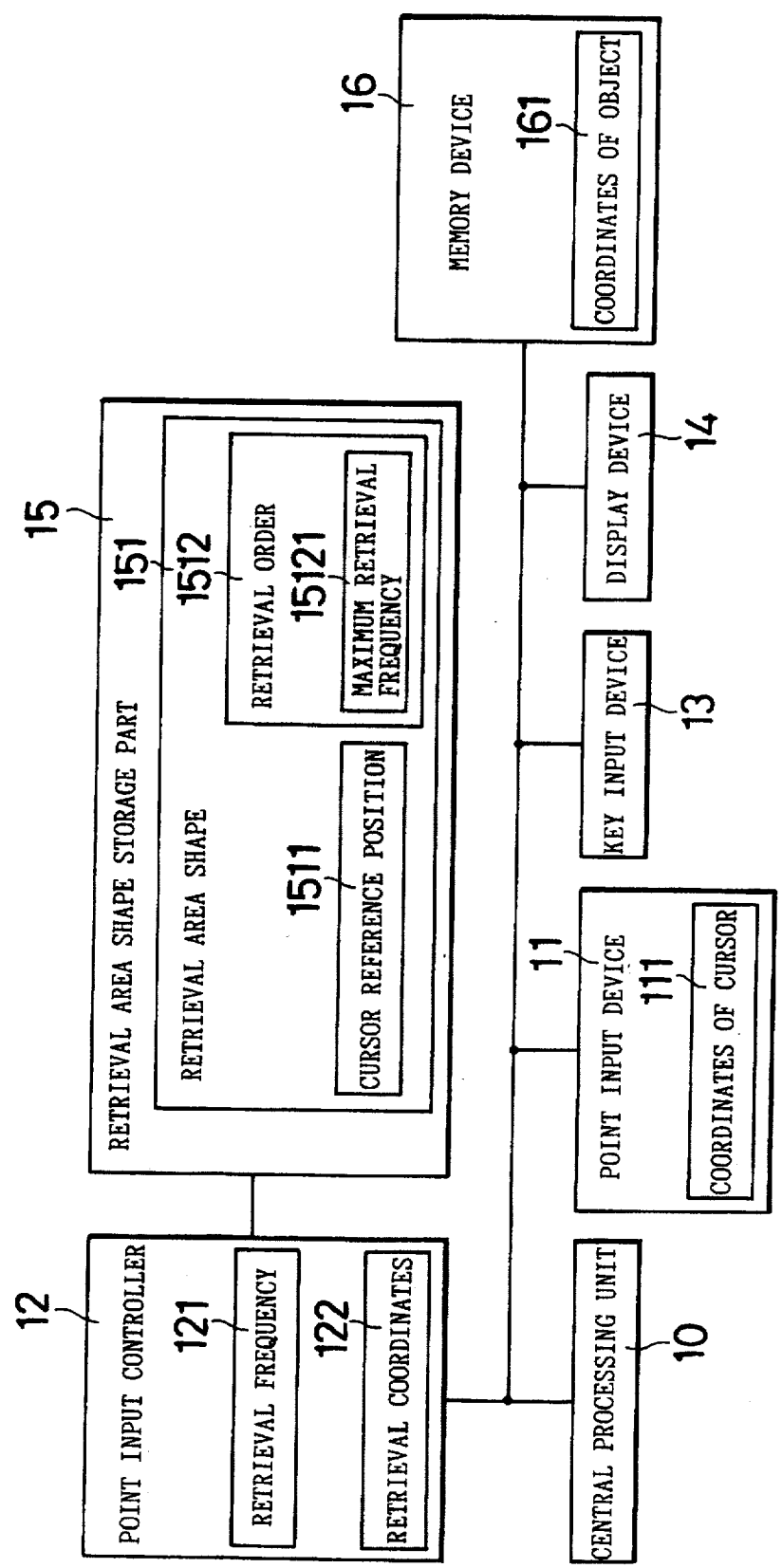
FIG. 1 is a block diagram showing a schematic electric structure according to one embodiment of the invention.

Now referring to the drawings, preferred embodiments of the invention are described below.

FIG. 1 shows a schematic electrical structure of an information processor of one embodiment of the present invention. A CPU 10 performs each kind of processing necessary as an information processor. To the CPU 10, a point input device 11, a point input controller 12, a key input device 13 and a display device 14 are connected via a system bus. As the point input device 11, various kinds of pointing devices such as a mouse, a track ball, and a combination of a tablet and a pen can be used. The point input controller 12 controls the point input device 11. The key input device 13 is used for inputting information such as commands and data by users. Part of data inputted to the information processor can be inputted from not only the point input device 11 but also the key input device 13. However, generally the operation of the input using the point input device is easier than the input using the key input device 13. The display device 14 can be realized by a dot-matrix structure LCD or CRT. The point input device 11 designates with a cursor a dot constituting a pixel on the screen. The shape of a retrieval area for retrieving an object which refers to the cursor position on the display screen of the display device 14 is stored in the retrieval area shape storage part 15. Various kinds of data and control programs are stored in a memory device 16 which is connected to the CPU 10 via a bus.

It is possible to read the coordinates 111 of the cursor from the point input device 11. The point input controller 12 retrieves an object while referring to the retrieval area shape storage part 15 by using as parameters a retrieval frequency 121 indicative of a frequency performed by the dot unit and retrieval coordinates 122 indicative of the coordinates 122 of a dot which constitutes an object of retrieval. In the retrieval area shape storage part 15, a retrieval area shape 151 is stored. As the retrieval area shape 151, a cursor reference position 1511 referred to in setting the retrieval area and a retrieval order 1512 constituting the movement order of dots in which the point input controller 12 retrieves in the retrieval area are included. The retrieval order 1512 includes a maximum retrieval frequency 15121. The CPU 10 reads the retrieval coordinates 122 from the point input device 12 to judge whether the retrieval coordinates 122 agree with the coordinates 161 of the object stored in the memory device 16. It is judged that the object is present within the retrieval area when the retrieval coordinates 122 agree with the coordinates 161 of the object. When the object comes into the retrieval area, different inputs are carried out depending on the kind of the object, namely a case where the object is immediately inputted, and a case where the object is inputted after other operations such as click are performed.

Figure 2:
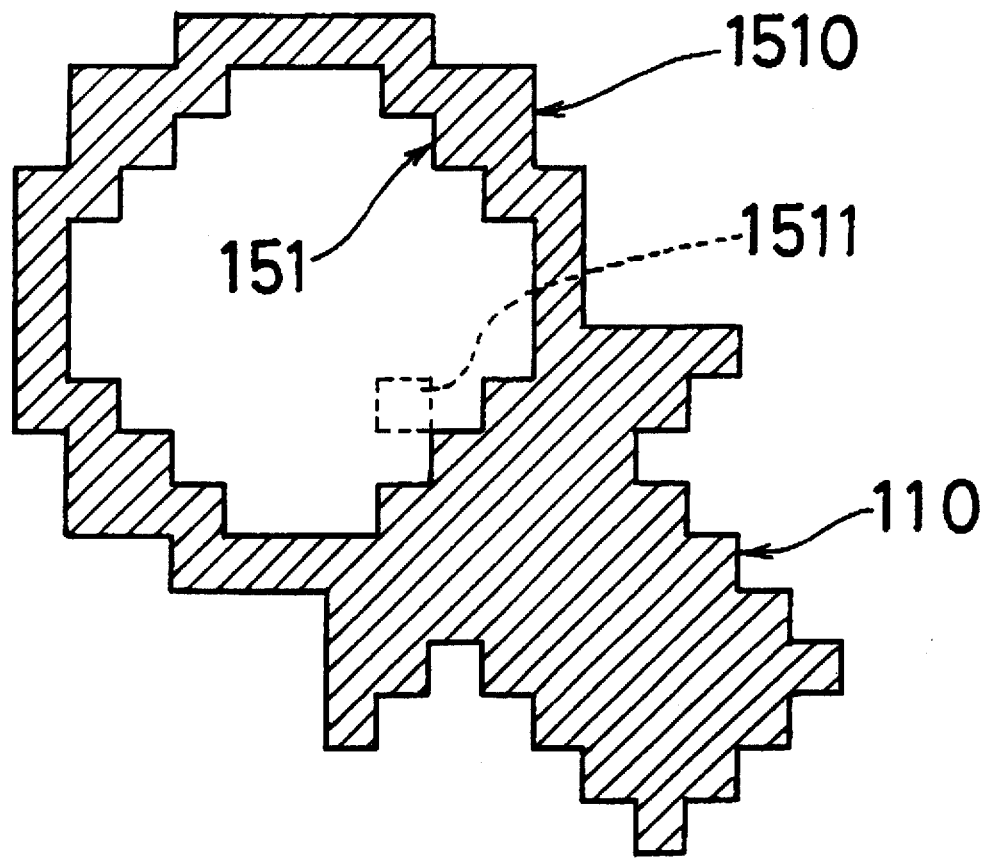
FIG. 2 is a view showing in an expanded manner a cursor and a retrieval area displayed in the embodiment of FIG. 1.

FIG. 2 shows an expanded view of a cursor shape 110 and an external retrieval-area shape 1510 representing the periphery of the retrieval area shape 151. In this embodiment, the cursor shape 110 is a left upward arrow, and the retrieval area shape 151 has a nearly circular shape. In this embodiment, a dot which corresponds to the cursor coordinates 111 is blinked and displayed. Thus the dot is displayed in a display mode different from the display mode of the cursor shape 110 and external retrieval-area shape 1510, to display the cursor reference position 1511. The cursor reference position 1511 is deviated to the right down position of the retrieval area shape 151.

Figure 3A:
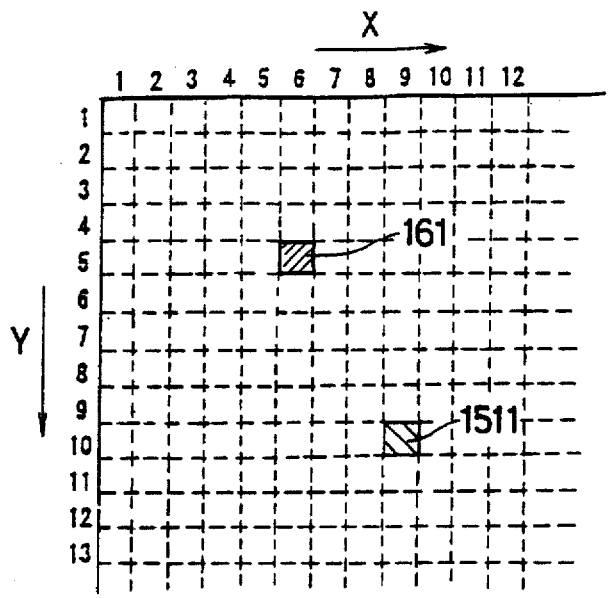
FIGS. 3A–3C are views for illustrating relations between an object retrieved in the embodiment of FIG. 1 and a retrieval area on the basis of a reference position of a cursor.
Figure 3B:
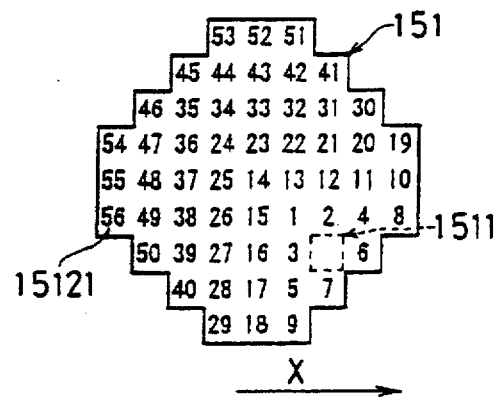

FIG. 3A shows a relation between the object coordinates 161 and the cursor reference position 1511. For the sake of explanation, the object coordinates 161 are set to (X=6, Y=5). The cursor coordinates 1511 are set to (X=9, Y=10). FIG. 3B shows one example of the retrieval area shape 151. With a dot which constitutes a pixel in a retrieval area shape 151 the retrieval order is preliminarily set by referring to the cursor reference position 1511. The object retrieval is performed in accordance with the set order of retrieval. The last value of the retrieval order is set to the maximum retrieval frequency 15121.

Figure 3C:
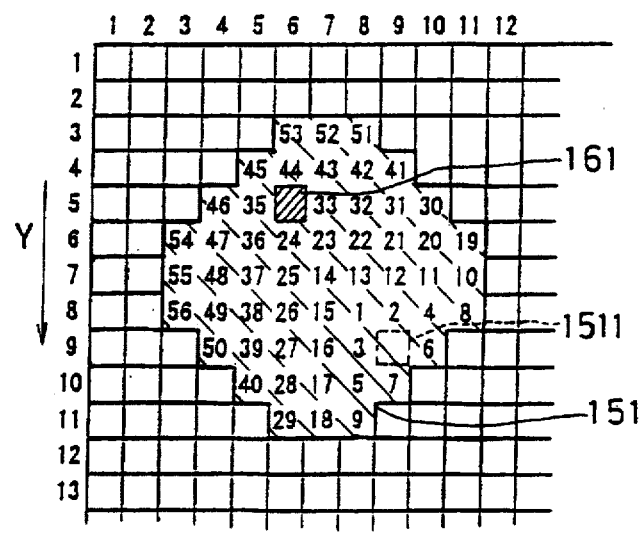

FIG. 3C shows a combination of the coordinates 161 of an object shown in FIG. 3A and the retrieval area shape 151 shown in FIG. 3B wherein the retrieval area is designated by slant lines. The first retrieval of the object is performed with respect to a dot of (X=8, Y=8) the retrieval order of which is 1. Then, the retrieval is performed in the order of (X=9, Y=8), (X=8, Y=9) and (X=10, Y=8). The coordinates 161 of the object are present in the dot at the position of (X=6, Y=5). Thus the retrieval order becomes 34, so that the presence of the object is detected in the 34th object retrieval.

Figure 4:
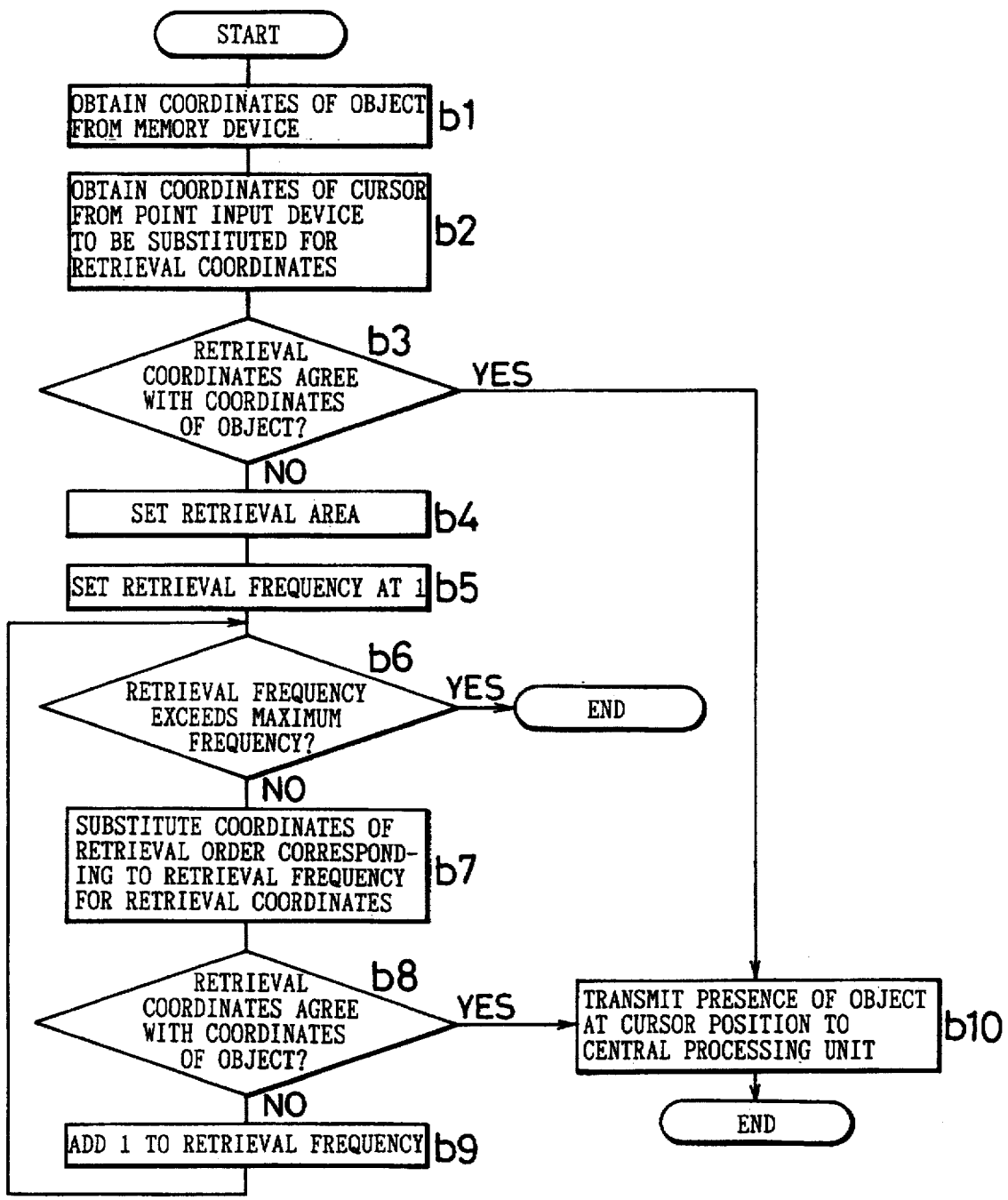
FIG. 4 is a flowchart for showing an operation of a point input controller according to the embodiment of FIG. 1.

FIG. 4 is a flowchart showing an outline of the processing at the point input controller 12 according to an embodiment shown in FIG. 1. At step b1 after the start of the operation, the coordinates 161 of the object are obtained from the memory device 16. At step b2, the coordinates 111 of the cursor are obtained from the point input device 11 to be substituted for the retrieval coordinates 122 of the point input device 12. At step b3, it is judged whether the retrieval coordinate 122 agrees with the coordinate 161 of the object. When the retrieval coordinates 122 do not agree with the coordinates 161 of the object, the retrieval area is set by referring to the coordinate 111 of the cursor. At step b5, the retrieval frequency 121 is set at 1. The processing from step b6 through step b9 is repeated to perform retrieval processing to search for the presence of the object. At step b6, it is judged whether or not the retrieval frequency 121 exceeds a maximum retrieval frequency 15121. When the condition is not established, at step b7 the coordinates of the retrieval order corresponding to the retrieval frequency 121 are substituted in the retrieval coordinates 122. It is judged at step b8 whether the retrieval coordinates 122 agree with the coordinate 161 of the object. When the retrieval coordinates 122 do not agree with the coordinates 161 of the object, 1 is added to the retrieval frequency 121 at step b9 returning to step b6. When it is judged at step b8 that retrieval coordinates 122 agree with the coordinates 161 of the object, the process proceeds to step b10. In the case where it is judged at step b3 that the retrieval coordinates 122 agree with the coordinates 161 of the object, the process also advances to step b10. At step b10, the presence of the object at the cursor position is transmitted to the CPU 10 to terminate the processing. Even when it is judged that the retrieval frequency 121 exceeds the maximum retrieval frequency at step b6, the absence of the object at the cursor position is transmitted to the CPU 10 to terminate the processing.

Figure 5:
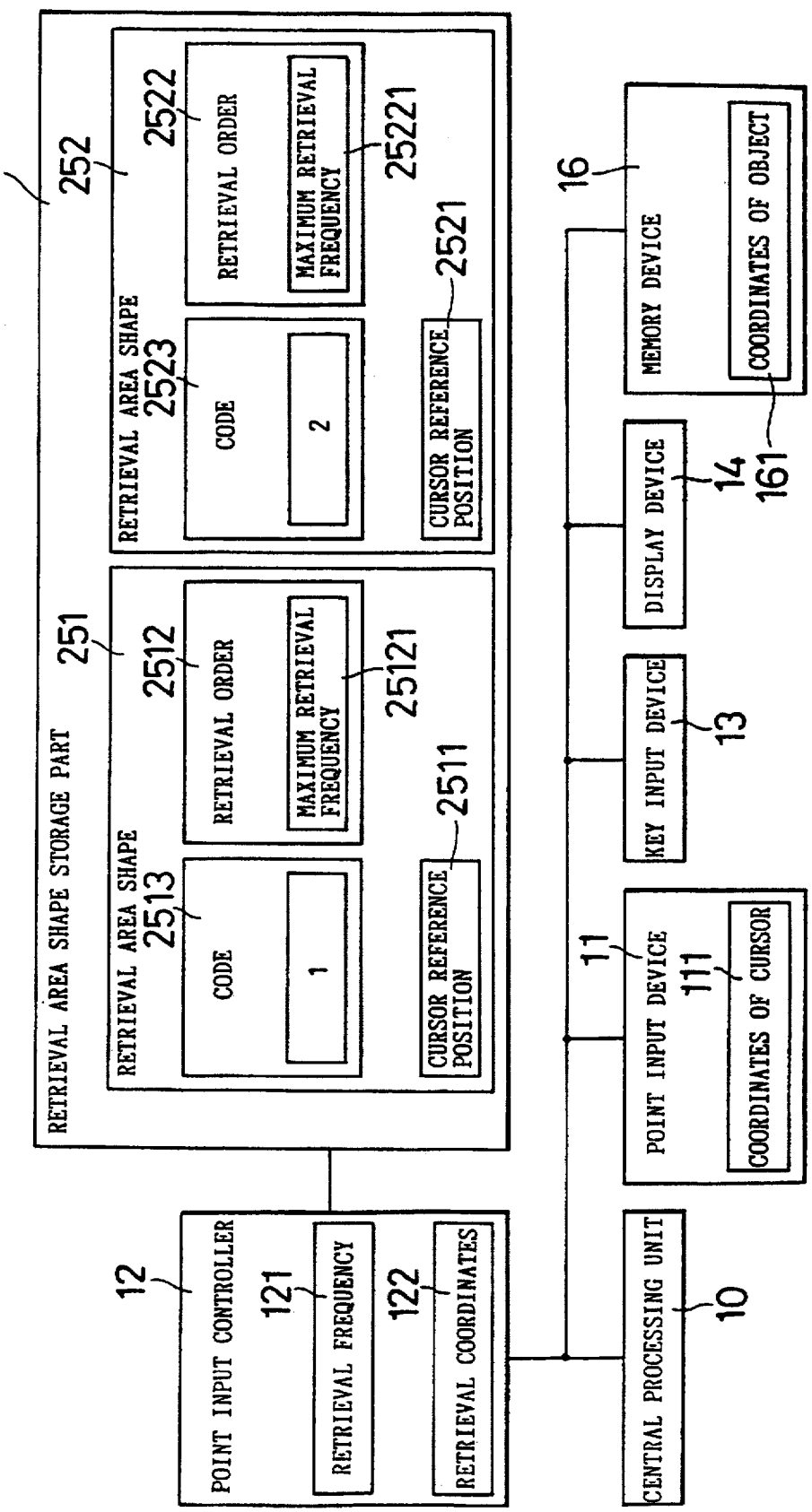
FIG. 5 is a block diagram showing a schematic electric structure according to another embodiment of the invention.

FIG. 5 shows a schematic electric structure of an information processor, the electric structure being concerned with the point input controller having a plurality of retrieval area shapes according to another embodiment of the invention. This embodiment is similar to the one shown in FIG. 1. The identical reference numerals designate corresponding parts. What should be noted is the fact that two kinds of retrieval area shapes, a first retrieval area shape 251 and a second retrieval are shape 252, are stored in the retrieval area shape storage part 25. In the first and the second retrieval area shapes 251 and 252, cursor reference positions 2511 and 2521, retrieval orders 2512 and 2522, the maximum retrieval frequencies 25121 and 25221 and codes 2513 and 2523 are included, respectively. The first retrieval area shape 251 is selected with a code 2513 indicative of "1". Then second retrieval area shape 252 is selected with the code 2523 indicative of "2".

Figure 6:
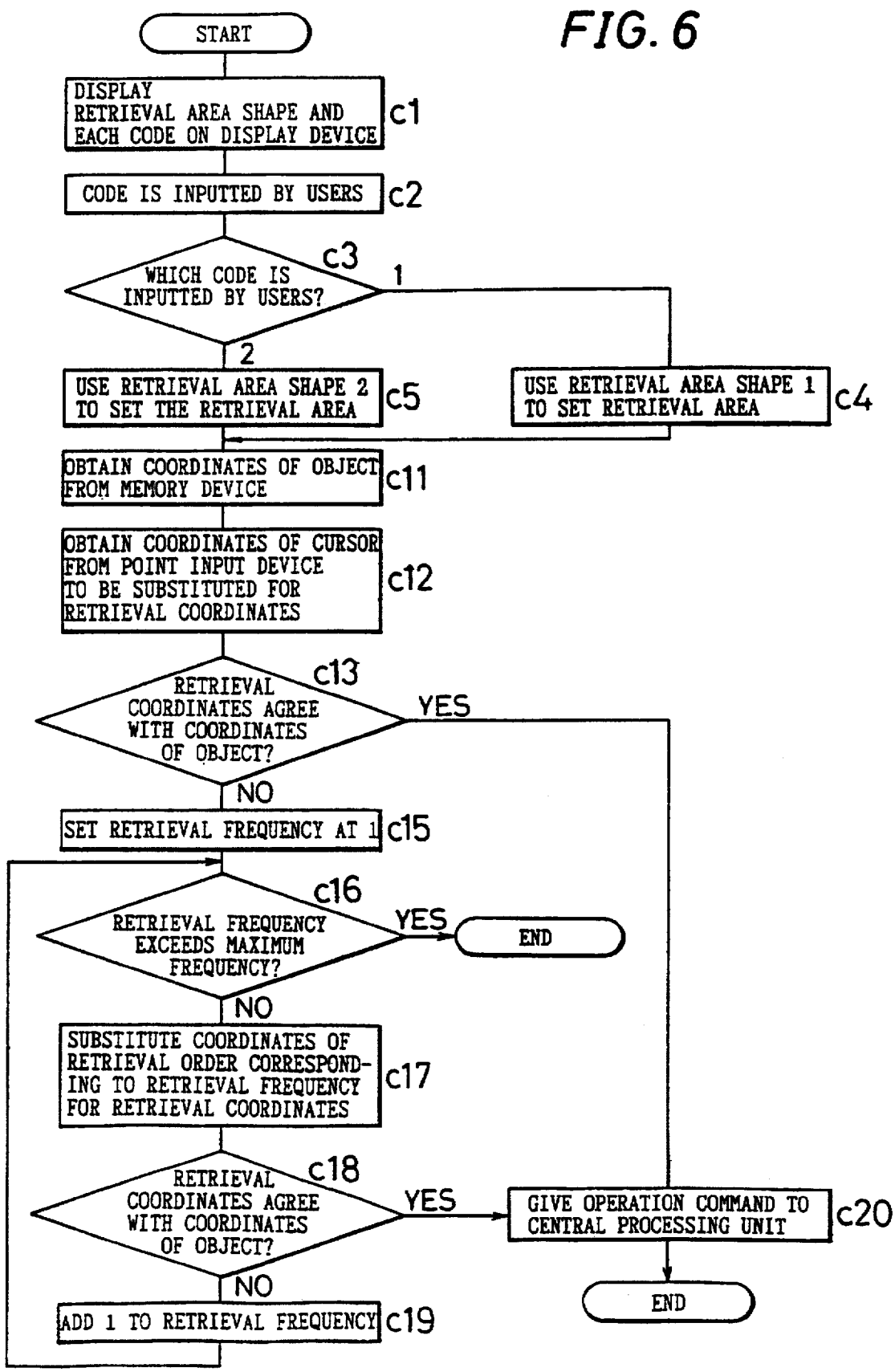
FIG. 6 is a flowchart showing an operation of a point input device according to the embodiment of FIG. 5.

FIG. 6 is a flowchart showing an outline of the processing at the point input controller 12 according to the embodiment shown in FIG. 5. At step c1 after the start of the processing, the retrieval area shapes 251 and 252 as well as respective codes 2513 and 2523 are displayed. Subsequently, at step c2, the code is inputted by a user who uses the point input controller. At step c3, the processing is branched off in accordance with the code inputted by a user so that the retrieval area is set by using the first retrieval area shape 251 at step c4 when the code is "1" while the retrieval area is set by using the second retrieval area shape 252 at step c5 when the code is "2".

When the retrieval area is set, the coordinates 161 of the object are obtained from the memory device 16 at step c11. At step c12, the coordinates 111 of the cursor are obtained from the point input device 11 to be substituted for the retrieval coordinates 121 in the point input controller 12. At step c13, the retrieval coordinates 122 are compared with the coordinate 161 of the object to judge whether they agree with each other. When the retrieval coordinates 122 do not agree with the coordinates 161 of the object, the process proceeds to step c15 to set the retrieval frequency 121 to 1. Then, the processing from step c16 through step c19 is repeatedly performed. It is judged at step c16 whether the retrieval frequency 121 exceeds the maximum retrieval frequency 15121. When the frequency 121 does not exceed the maximum frequency 15121, the dot coordinates designated by the retrieval order in accordance with the retrieval frequency 121 are substituted in the retrieval coordinates 122. At step c18, it is judged whether the retrieval coordinates 122 agree with the coordinates 161 of the object. When the retrieval coordinates 122 do not agree with the coordinates of the object 161, the process proceeds to step c19 and then add 1 to the retrieval frequency 121 to return to step c16. When it is judged at step 13 or step c18 that the retrieval coordinate 122 agrees with the coordinates 161 of the object, at step c20 an operation command corresponding to the object is given to the CPU 10 thereby terminating the processing. When the retrieval frequency 121 exceeds the maximum retrieval frequency 15121 at step c16, it has been made clear that the object is not present in the retrieval area to notify the CPU 10 of the fact thereby terminating the processing.

As two kinds of retrieval area shapes 251 and 252 in this embodiment, preferably one shape is formed into a right-handed arrow shape as shown in FIG. 2 while the other retrieval area is formed into a linear symmetrical left-handed arrow shape. Further, it is preferable that three or more kinds of retrieval area shapes are provided in order to select a retrieval area shape in accordance with the shape of the pointing device such as a mouse, a track ball, and a combination of a pen and a tablet.

In each of the aforementioned embodiments, the dot retrieval in the retrieval area is performed in accordance with the order of retrieval set for each dot. However, a regular rule for retrieval may be set such as a spiral retrieval in one definite direction. Further, the retrieval area shape 151 may be changed in accordance with the density etc. of objects or may be changed over from display to non-display and vice versa.

Figure 7A:
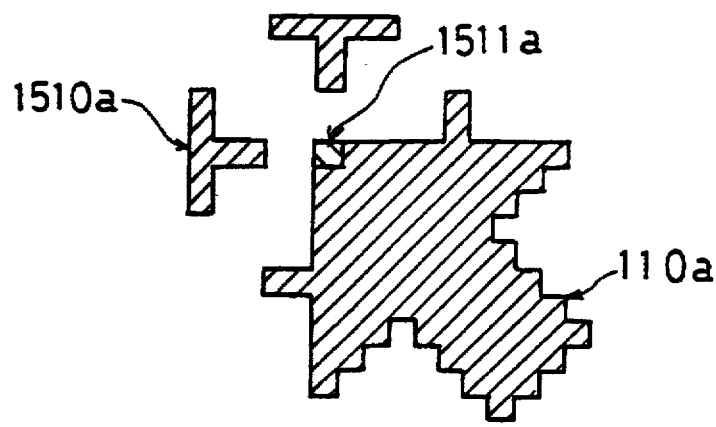
FIGS. 7A–7C are views showing a cursor and a retrieval area according to still another embodiment of the invention.
Figure 7B:
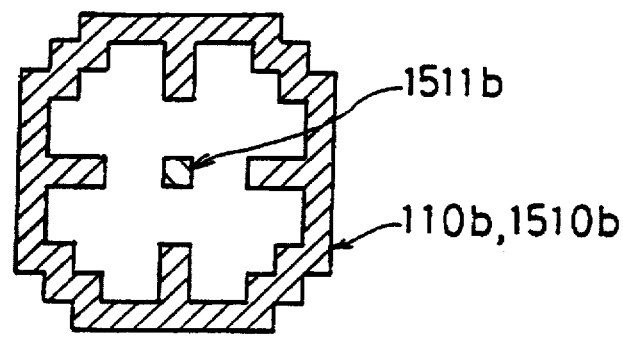
Figure 7C:
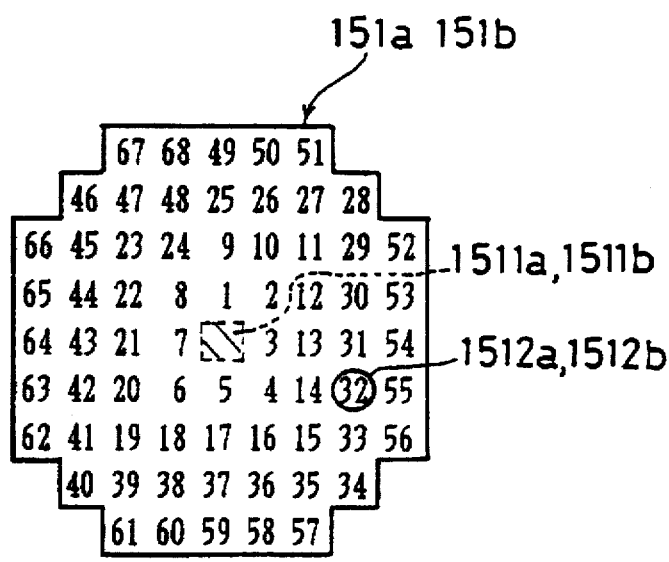

FIGS. 7A through 7C show another embodiment with respect to the cursor shape. FIG. 7A shows a concept of combining an arrow-like cursor shape 110a with an external retrieval area shape 1510a represented by four T-shaped figures. FIG. 7B shows a concept in which an equidirectional and nearly circular shape is used both as a cursor shape 110b and an external retrieval-area shape 1510b. FIG. 7C show retrieval area shapes 151a and 151b preferable for FIGS. 7A and 7B thereby showing retrieval orders 1512a and 1512b when retrieval is performed from a central cursor reference positions 1511a and 1511b to the outside.

Figure 8A:
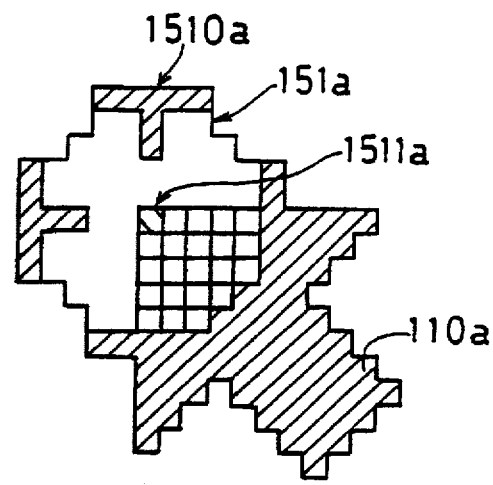
FIGS. 8A–8C are views showing combinations of a cursor and a retrieval area according to the embodiment of FIGS. 7A–7C.
Figure 8B:
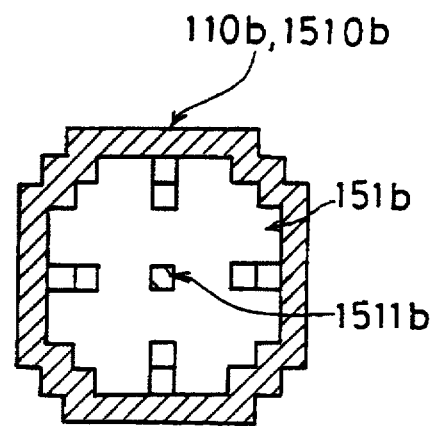
Figure 8C:
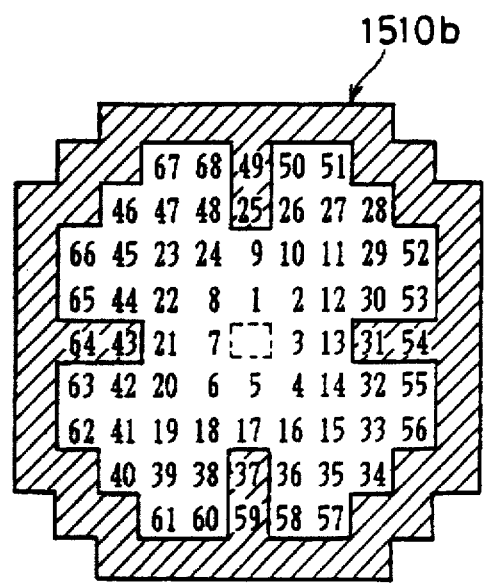

FIGS. 8A–8C show states in which cursor shapes 110a and 110b shown in FIGS. 7A–7B, retrieval area shapes 151a and 151b and external retrieval-area shapes 1510a and 1510b are combined, respectively. FIGS. 8A and 8B shows a retrieval area shape 151a and a retrieval area shape 151b with slant lines. FIG. 8C shows a retrieval order in the external retrieval-area shape 1510b. This retrieval order in FIG. 8C is the same as that in FIG. 7C.

Figure 9:
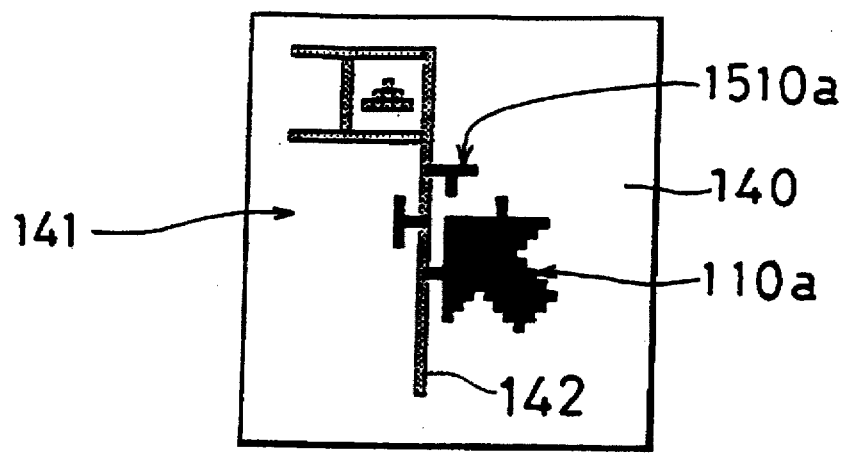
FIG. 9 is a view showing the state of usage of the embodiment of FIGS. 7A–7C.
Figure 10:
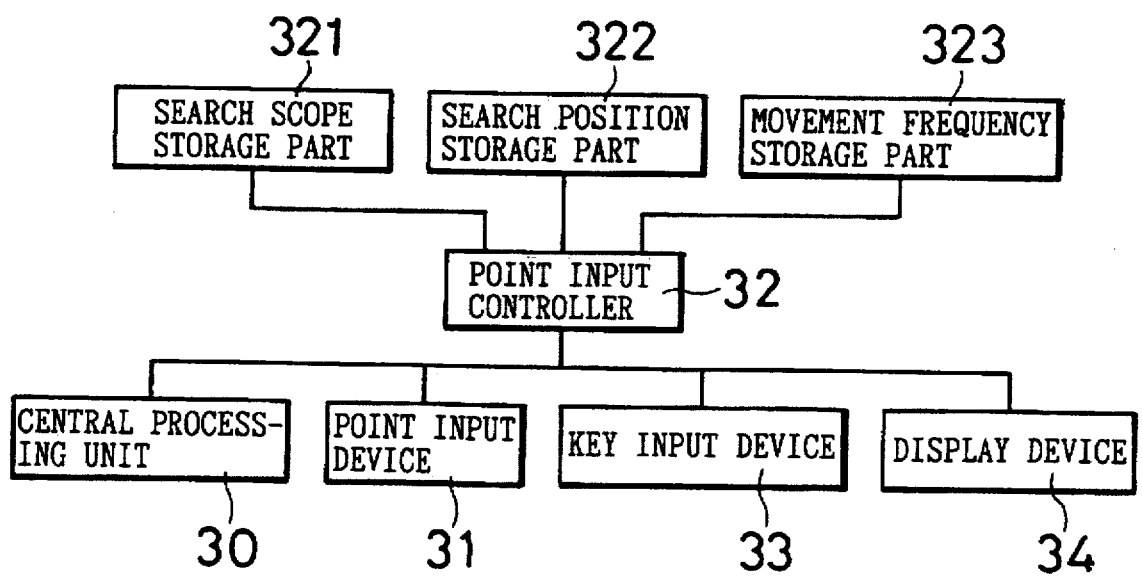
FIG. 10 is a block diagram showing a schematic electrical structure of the prior art.
Figure 11:
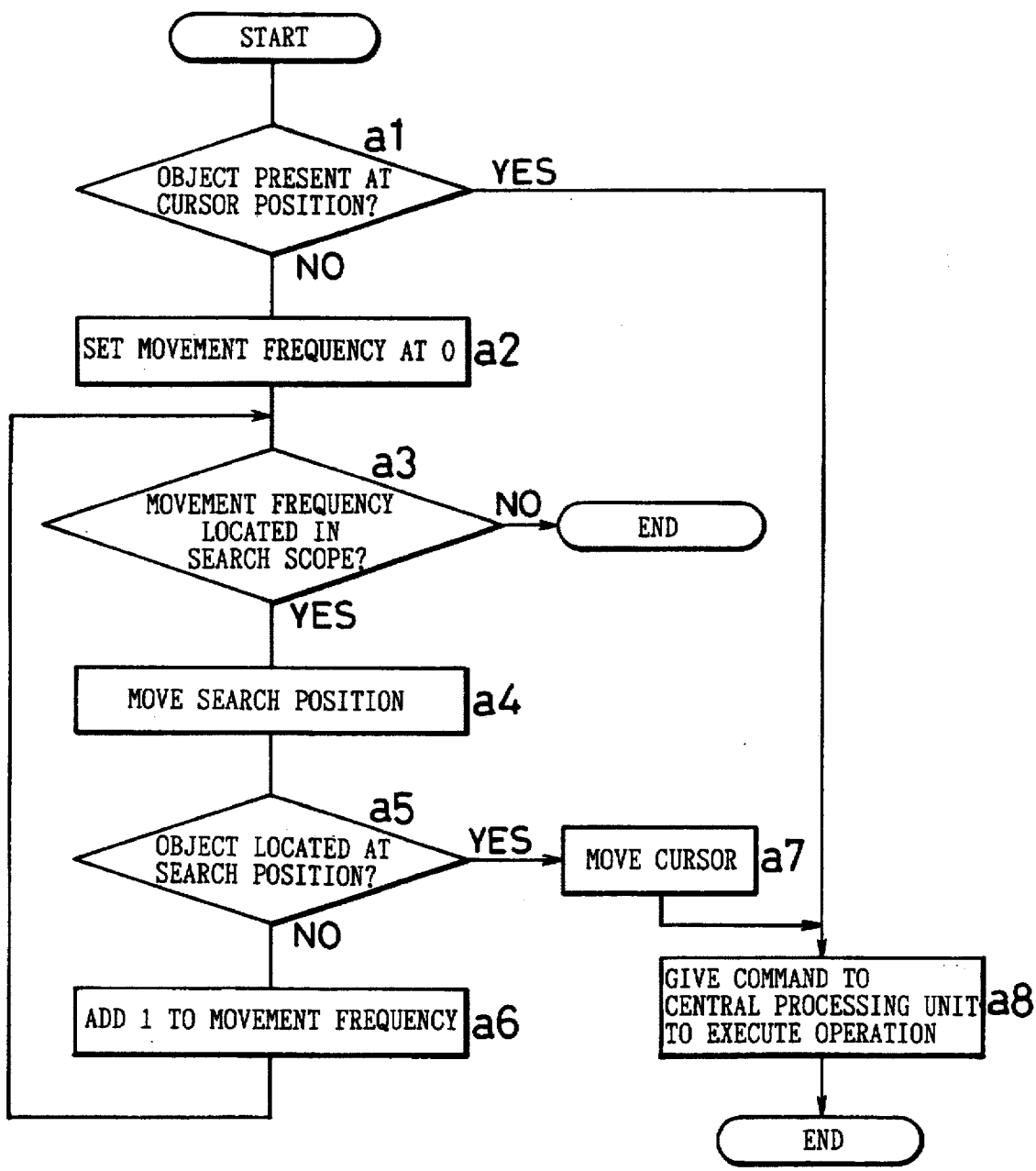
FIG. 11 is a flowchart showing an operation of the prior art of FIG. 10.

FIG. 9 shows specific examples of the usage of the cursor shape 110a and an external retrieval-area shape 1510a. A display screen 140 displays at the left side thereof the right end of a window 141. A vertical rod 142 is selected with a mouse to change the size of the window 141. In accordance with the conventional concept, it is necessary to accurately set the end of the arrow of the cursor shape 110a to the vertical rod 142. However, in this embodiment, even when the tip position of the arrow of the cursor shape 110a is deviated, selection is possible within the external retrieval-area shape 1510a thereby improving the operability thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processor in which a cursor is moved on an information display screen to select an object designated by the cursor, the processor comprising:

area setting means for setting a retrieval area on the information display screen by referencing a cursor position, the set retrieval area having a center offset from the referenced cursor position; and selection means for retrieving an object present within the set retrieval area.

2. The information processor of claim 1, wherein within the retrieval area a reference cursor position for object retrieval is displayed on the information display screen in a mode different from the display mode of the cursor itself.

3. The information processor of claim 1, wherein the processor includes a plurality of shapes as potential retrieval areas, any of which may be selected.

4. An information processor in which a displayed cursor is moved on an information display screen to input and process an object designated by the cursor, the processor comprising:

display control means for displaying a retrieval area in a predetermined relation to a cursor position on the information display screen; and selection means for retrieving an object present within the displayed retrieval area by referencing the cursor position.

5. The information processor of claim 4, wherein within the retrieval area a reference cursor position for object retrieval is displayed on the information display screen in a mode different from the display mode of the cursor itself.

6. The information processor of claim 4, wherein the processor includes a plurality of shapes as potential retrieval areas, any of which may be selected.

7. The information processor of claim 4, wherein the retrieval area of the display control means includes a shape which is a combination of a nearly circular shape and an arrow-shaped cursor.

8. The information processor according to claim 4, wherein the cursor is arrow shaped and the tip of the arrow shaped cursor corresponds to the cursor coordinate position and the center of the set retrieval area.

9. The information processor according to claim 4, wherein the boundary of the retrieval area is displayed to the user as four T-shaped figures.

10. The system according to claim 4, wherein the displayed retrieval area moves as the cursor moves.

11. The information processor according to claim 4, wherein the cursor is substantially circular shaped and the boundary of the displayed retrieval area corresponds to the boundary of the displayed cursor shape.

12. A graphical user interface system with which a user selects a displayed object by moving a displayed cursor within proximity of the displayed object, the location of the cursor being defined by a coordinate position, said system comprising:

a memory for storing a coordinate position defining the location of the displayed object; and a processor for setting a shaped retrieval area designating a range of reference coordinate positions for ordered comparison with the object coordinate position, the set retrieval area having a center which is offset from the cursor coordinate position, said processor performing an ordered comparison of the reference coordinate positions with the object coordinate position to determine whether the object has been selected.

13. The system according to claim 12, wherein the cursor is arrow shaped and the retrieval area is set in accordance with the pointing direction of the arrow shaped cursor.

14. The system according to claim 12, wherein the cursor is moved with either a mouse or a pen and tablet combination input device, and the retrieval area is set in accordance with which input device is used.

15. The system according to claim 12, wherein the retrieval area is set based on an indication of whether the user is right-handed or left-handed.

16. A graphical user interface system with which a user selects a displayed object by moving a cursor within proximity of the displayed object, said system comprising:

a memory for storing a plurality of potential retrieval area configurations;

a display screen for displaying to the user the plurality of potential retrieval area configurations;

an input device for receiving a user designated selection of one of the displayed potential retrieval area configurations, the selected retrieval area configuration being used to determine subsequent object selection.

17. The system according to claim 16, wherein the selected retrieval area configuration is displayed during subsequent use of the system.

18. A method for selecting a displayed object in accordance with movement of a displayed cursor within proximity of the displayed object, the location of the cursor being defined by a coordinate position, said method comprising the steps of:

storing a coordinate position defining the location of the displayed object;

setting a shaped retrieval area designating a range of reference coordinate positions for ordered comparison with the object coordinate position, the set retrieval area having a center which is offset from the cursor coordinate position; and performing an ordered comparison of the reference coordinate positions with the object coordinate position to determine whether the displayed object has been selected.

19. The method according to claim 18, wherein the cursor is arrow shaped and the retrieval area is set in accordance with the pointing direction of the arrow shaped cursor.

20. The method according to claim 18, wherein the cursor is moved with either a mouse or a pen and tablet combination input device, and the retrieval area is set in accordance with which input device is used.

21. The method according to claim 18, wherein the retrieval area is set based on an indication of whether the user is right-handed or left-handed.

22. A method for selecting a displayed object in accordance with movement of a cursor within proximity of the displayed object, said method comprising the steps of:

storing a plurality of potential retrieval area configurations;

displaying to the user the plurality of potential retrieval area configurations; and receiving a user designated selection of one of the displayed potential retrieval area configurations for subsequent displayed object selection.

23. The method according to claim 22, wherein the selected retrieval area configuration is displayed during subsequent displayed object selection.

24. A method for selecting a displayed object in accordance with movement of a displayed cursor within proximity of the displayed object, said method comprising the steps of:

displaying a retrieval area in a predetermined relation to the displayed cursor; and determining whether a coordinate position representing the location of the displayed object is present within the displayed retrieval area.

25. The method according to claim 24, wherein a plurality of potential retrieval area configurations are stored in memory.

26. The method according to claim 24, wherein the cursor is arrow shaped and the tip of the arrow shaped cursor corresponds to the cursor coordinate position and the center of the set retrieval area.

27. The method according to claim 24, wherein the boundary of the retrieval area is displayed to the user as four T-shaped figures.

28. The method according to claim 24, wherein the displayed retrieval area moves as the user moves the cursor.

29. The method according to claim 24, wherein the displayed cursor is substantially circular shaped and the boundary of the displayed retrieval area corresponds to the boundary of the displayed cursor shape.

* * * * *